United States Patent
Harvey et al.

(10) Patent No.: US 6,903,174 B2
(45) Date of Patent: Jun. 7, 2005

(54) COPOLYMER OF ETHYLENE OXIDE AND AT LEAST ONE SUBSTITUTED OXIRANE CARRYING A CROSS-LINKABLE FUNCTION, PROCESS FOR PREPARATION THEREOF AND USE THEREOF FOR PRODUCING MATERIALS WITH IONIC CONDUCTION

(75) Inventors: Paul-Etienne Harvey, St. Hubert (CA); Jean-Yves Sanchez, Saint Ismier (FR); Fannie Alloin, Grenoble (FR)

(73) Assignee: Hydro-Quebec, Montreal (CA)

( * ) Notice: Subject to any disclaimer, the term of this patent is extended or adjusted under 35 U.S.C. 154(b) by 13 days.

(21) Appl. No.: 10/428,001

(22) Filed: May 2, 2003

(65) Prior Publication Data

US 2004/0038132 A1 Feb. 26, 2004

Related U.S. Application Data

(63) Continuation of application No. 08/882,296, filed on Jun. 25, 1997, now abandoned, which is a continuation of application No. 08/350,029, filed on Nov. 29, 1994, now abandoned.

(30) Foreign Application Priority Data

Dec. 9, 1993 (CA) .............................................. 2111047

(51) Int. Cl.[7] ................................................ C08F 24/00
(52) U.S. Cl. ...................... 526/273; 528/393; 429/317; 429/188
(58) Field of Search ........................ 526/273; 528/393; 429/317, 188

(56) References Cited

U.S. PATENT DOCUMENTS

| | | | |
|---|---|---|---|
| 3,393,243 A | 7/1968 | Cuscurida | |
| 4,578,326 A | 3/1986 | Armand et al. | |
| 4,764,567 A | 8/1988 | Ott | |
| 5,086,351 A | 2/1992 | Couput et al. | |
| 5,206,756 A | 4/1993 | Chesire | |
| 5,350,646 A | 9/1994 | Armand et al. | |
| 5,393,847 A | * | 2/1995 | Alloin et al. ................ 525/403 |

FOREIGN PATENT DOCUMENTS

FR 2570224 3/1986

OTHER PUBLICATIONS

Charles C. Price, et al., Polymerization and Copolymerizationof Some Epoxides by Potassium tert-Butoxide in DMSO, Journal of Polymer Science: Part A-1, vol. 7, 1969, pp. 569–574.

Donald M. Simons, The Polymerization of Propylen Oxide, Journal of Polymer Science, vol. 44, 1960, pp. 303–311.

* cited by examiner

Primary Examiner—William K. Cheung
(74) Attorney, Agent, or Firm—Oblon, Spivak, McClelland, Maier & Neustadt, P.C.

(57) ABSTRACT

The invention concerns a copolymer of ethylene oxide and at least one substituted oxirane carrying a cross-linkable function. The copolymer comprises ethylene oxide, —O—CH$_2$—CHR— units in which R is a substituent containing a reactive function which is cross-linkable by free radical process, R may be different from one unit to the other, and possibly —O—CH$_2$—CHR'— units in which R' is a substituent containing no reactive function which is cross-linkable by means of a free radical process, R' may be different from one unit to the other. It is characterized by an excellent polymolecularity index I=Mw/Mn and a statistical distribution of the different monomer units. The copolymer is prepared by an anionic copolymerization process. The copolymer is useful for preparing a solid electrolyte having good mechanical properties, a good cationic conductivity and a good chemical compatibility with the electrodes of a generator operating with alkali metals such as lithium and sodium.

13 Claims, 2 Drawing Sheets

Molecular weight in g

COPOLYMER OF ETHYLENE OXIDE AND AT LEAST ONE SUBSTITUTED OXIRANE CARRYING A CROSS-LINKABLE FUNCTION, PROCESS FOR PREPARATION THEREOF AND USE THEREOF FOR PRODUCING MATERIALS WITH IONIC CONDUCTION

BACKGROUND OF INVENTION a) Field of the Invention

The present invention concerns a copolymer of ethylene oxide and at least one substituted oxirane carrying a cross-linkable function, a process for the preparation thereof and the use thereof for producing a solid electrolyte having good mechanical properties, a good cationic conductivity and a good chemical compatibility with the electrodes of a generator which operates with alkali metals such as lithium and sodium.

b) Description of Prior Art

It is known to use solvating polymers for preparing ionically conductive materials. The polymers of ethylene oxide or of dioxolane are polymers which solvate cations, in particular alkali cations such as for example the ion $Li^+$ which is present in rechargeable electrochemical generators of the polymer electrolyte lithium battery type. However, these polymers are semi-crystalline, the rate of crystallinity varying has a function of the molecular weight of the polymer. This semi-crystalline character of the polymers as the consequence of decreasing the conductivity of the materials in which the polymers are present.

It has then been found that it was possible to decrease the crystallinity of semi-crystalline polymers, without affecting their solvating properties and their electrochemical stability, by introducing irregularities in the macromolecular chain at possibly irregular interval. However, it has been observed that the introduction in a semi-crystalline polymer, such as for example a high molecular weight, polyoxyethylene (POE), of units producing irregularities, i.e. replacing of semi-crystalline polymer by a copolymer or a polycondensate, is frequently accompanied by a decrease of the molecular weights and the mechanical properties, for example at high temperature. An attempt was made to overcome this inconvenience by introducing into the polymer, units which enable the formation of tri-dimensional networks by cross-linking the copolymer, before or after its formation. By reason of the restraints imposed by the requirements of electrochemical stability, the particularly preferred units permitting cross-linking are selected among those which contain an unsaturated carbon/carbon bond, such as an allyl bond or a vinyl bond. The introduction of such units into a copolymer, additionally enables to fix various groups, for example ionic groups, on the macromolecular chain.

It is known to prepare copolymers of an ethylene oxide and an oxirane carrying an unsaturated substituent by coordination polymerization by utilizing an initiator based on organometallic derivatives of non alkali and non alkali-earth metals, for example an alkyl aluminum or an alkyl zinc. This type of polymerization is not sensitive to the presence of a small quantity of impurities. However, the reactivity of the different comonomers depends on their steric hindrance. Thus, when there is produced a copolymer of ethylene oxide and an oxirane carrying a saturated substituent (for example propylene oxide) or an oxirane carrying an unsaturated substituent (for example allyl glycidyl ether), the polymerization yield of the ethylene oxide is near 100%, while the yield of the substituted oxirane in a copolymer having a molecular weight higher than 1000 is only 60%. In addition, ethylene oxide is preferably consumed at the start of the polymerization. Because of the difference of reactivity of the monomers, the copolymer formed at the start of the polymerization contains more ethylene oxide and has a higher molecular weight than the one formed in the middle or at the end of the polymerization reaction. The copolymer formed by coordination polymerization thus has long sequences of poly(oxyethylene) which are crystalline and present a high heterogeneity of molecular weights.

It is known to polymerize saturated oxiranes such as ethylene oxide or propylene oxide through an ionic process. When such a polymerization is carried out by means of initiators of the sodium hydroxide or potassium hydroxide type in aqueous solution or in protic solvents such as ethylene glycol, a number of transfer reactions towards the solvent take place, and the molecular weights obtained are very low. When the ionic polymerization of oxiranes is carried out in the presence of initiators of the potassium alcoholate or cesium alcoholate type in an aprotic solvent which solvates cations or in the presence of complexing agents such as crown-ethers, ethylene oxide undergoes a living polymerization, i.e. the average degree of polymerization in number (DPn) increases with the conversion rate, the distribution of the molecular weights is narrow, the polymolecularity index I=Mw/Mn is near 1 and there is practically no transfer and termination reactions. An ionic polymerization which is carried out under these conditions enables to obtain high masses when the polymer is ethylene oxide. However, when used with monomers of the substituted oxirane type, it has only been possible to obtain oligomers to this date. For example, the polymerization of styrene oxide initiated with potassium tert-butanolate gives a poly(oxystyrene) having a mass of 1000 g, and the growth of the poly(oxypropylene) chains is interrupted by reactions of transfer towards the monomer [D-M Simons and U. Verbane, J. Polym. Sc. 1960, 44, 303]. When the monomer is phenyl glycidyl ether, the growth of the chains is also rapidly interrupted by transfer towards the monomer [C. C. Price, Y. Atarachi, R. Yamamoto, J. Poly. Sci. PartA1, 1969, 7, 569). In spite of the advantages associated with the nearly quantitative conversion rates of anionic polymerizations, the prior art shows the living character of the polymerization for ethylene oxide only.

The present invention aims at providing a copolymer of ethylene oxide and at least one substituted oxirane carrying a cross-linkable reactive function, by a free radical process, which enables to obtain an ionically conductive material improved mechanical properties as compared to the materials obtained from known copolymers of the type poly (oxyalkylene), without decreasing the ionic conductivity by an excess number of cross-linking points which would cause an increase of the vitreous transition temperature Tg, said ionically conductive material additionally showing an excellent chemical compatibility with the electrodes of a generator when the material is used as an electrolyte.

SUMMARY OF INVENTION

It is consequently an object of the present invention to provide a copolymer in which the chain comprises ethylene oxide units, —O—CH$_2$—CHR— units in which R is a substituent having a reactive function which is cross-linkable by free radical process, R may be different from one unit to the other, and possibly —O—CH$_2$—CHR'— units in which R' is a substituent having no reactive function which is cross-linkable by free radical process, R' may be different from one unit to the other, characterized in that it has an excellent polymolecularity index I=Mw/Mn and a statistical distribution of the different monomer units.

Among the copolymers of the present invention, those which have an average molecular mass in Mn number higher or equal to 20,000, more specially those which have a Mn mass higher or equal to 100,000, are particularly interesting.

By excellent index of polymolecularity, there is meant an index lower than or equal to 2.2. The copolymers of the present invention in general have an index of polymolecularity which is between 1.5 and 2.2.

The different units are distributed at random in the chain of a copolymer of the present invention, however, the sequences constituted by the chain of a same monomer unit are more regular than in copolymers obtained by known processes, i.e. by coordination polymerization. It is therefore relatively easy to foresee the length of the sequences which depends only on the relative proportion of the monomers. The statistical distribution of the monomer units is an important characteristic when the copolymer obtained is subject to grafting in order to fix an ionic group on the reactive function of the substituents R of the oxirane unit. A statistical distribution of the ionic groups is essential in order to prevent the formation of privileged passageways for the ions, when the copolymer is used as an ionically conductive material.

DESCRIPTION OF PREFERRED EMBODIMENTS

In the —O—$CH_2$—CHR— units of a copolymer of the present invention, the reactive function which is cross-linkable by free radical process and which is present in the radical R, is advantageously an unsaturated carbon/carbon bond. The radical R may in this case be selected for example among radicals having the formula $CH_2$=CH—$(CH_2)_q$—(O—$CH_2)_p$ in which $1 \leq q \leq 6$ and p=0 or 1, or the formula $CH_3$—$(CH_2)_y$—CH=CH—$(CH_2)_x$—$(OCH_2)_p$, in which $0 \leq x+y \leq 5$ and p=0 or 1. In the same macromolecular chain, the unsaturated substituents R may not be all identical.

In the —O—$CH_2$—CHR'— units of a copolymer of the present invention, the substituent R' having no reactive function which is cross-linkable by free radical process may be selected among alkyl radicals, preferably among the alkyl radicals having 1 to 16 carbon atoms, more preferably among the alkyl radicals having 1 to 8 carbon atoms.

The substituent R' may additionally be selected among alkoxy radicals such as the radicals —$(CH_2)_n$—O—$((CH_2)_m$—O$)_p$—$CH_3$, in which $0 \leq n \leq 4$, $1 \leq m \leq 4$ and $0 \leq p \leq 20$; preferably n=1, m=2 and $0 \leq p \leq 8$. The substituent R' may also be selected from the alkyl (perfluoroalkyl sulfonate) ether radicals; by way of example, there may be mentioned radicals having the formula —$CH_2$—O—$(CF_2)_q$—$CF(C_rF_{2r+1})$—$SO_3M$, in which M represents a cation of an alkali metal, in which $0 \leq q \leq 4$, preferably q=0 or 1, and $0 \leq r \leq 4$, preferably $0 \leq r \leq 3$; among the preferred radicals of this category, there may be mentioned the radicals —$CH_2$—O—$CF_2$—$CF_2$—$SO_3M$, —$CH_2$—O—$CF_2$—$CF(CF_3)$—$SO_3M$ and —$CH_2$—O—$CF_2$—$SO_3M$. The substituent R' may also be selected among radicals including an ionophoric function in which the negative charge is carried by the bis (trifluoromethylsulfonyl) methylide —$C(SO_2CF_3)_2M''$ carbanion; among these radicals may be mentioned —$CH_2$—$C(SO_2$—$CF_3)_2M''$ and —$(CH_2)_s$—$SO_2$—$C(SO_2$—$CF_3)_2M''$, in which $1 \leq s \leq 16$, preferably $0 \leq s \leq 8$, M'' represents a metallic cation, more particularly a monovalent cation such as a cation of an alkali metal. The radicals —$CH_2$—$C(SO_2$—$CF_3)_2M''$ and —$(CH_2)_s$—$SO_2$—$C(SO_2$—$CF_3)_2M''$ are particularly preferred.

In a same macromolecular chain, all the substituents R' may not be identical.

The copolymers of the present invention which have an average molecular mass of high Mn number, i.e. at least equal to 20,000, preferably at least equal to 100,000, have a double interest. On the one hand, these copolymers have, in non cross-linked state, intrinsic mechanical properties superior to the copolymers of the same type, of the prior art: they may be prepared and handled in the form of thin films before cross-linking; they may additionally be used as elastomeric bond or as an adhesive when assembling components of a generator. If cross-linking is necessary, a lower rate of cross-linkable functions may be used. On the other hand, a high molecular mass enables to use higher quantities of polymerization initiator and limits the number of terminal reactive functions which are alcoholates or hydroxyls. In the copolymers of the present invention having a molecular mass of at least 20,000, there is consequently a double limitation of the concentration and the mobility of the reactive chemical groups (terminal functions, polymerization initiators, cross-linkable functions which are sensitive to alkali metals, light weight polymers capable of diffusing into the electrodes) which presents a major interest when a copolymer according to the present invention is used as an ionically conductive material, for example in a generator operating with alkali metals. In this case, the ionic conductivity of an ionically conductive material comprising the copolymer is not substantially reduced by cross-linking, because the low rate of cross-linking has a negligible effect on the vitreous transition temperature Tg. In addition, the electrochemical compatibility of the ionically conductive material, used as electrolyte, with the electrodes of a generator is clearly higher.

In a particular embodiment, a copolymer according to the present invention contains at least 70 mole % of oxyethylene units, about 2 to about 30 mole % of saturated units —O—$CH_2$—CHR'—, and about 0.05 to about 10 mole % of —O—$CH_2$—CHR— units containing functions which are cross-linkable by free radical process.

The copolymers of the present invention are obtained by a process of anionic copolymerization, and it is also an object of the invention to provide a process for the preparation of said copolymers.

The process for the preparation of a copolymer according to the present invention is characterized in that it consists in reacting ethylene oxide and one or more substituted oxiranes among which one at least carries a substituent R containing a function which is cross-linkable by a free radical process, in an aprotic solvent in the presence of an anionic polymerization initiator, the monomers and the solvent used having a water and impurity content lower than or equal to 100 ppm, the reactor used for the polymerization reaction being free of traces of humidity and impurities.

In the description which follows, an oxirane carrying a substituent containing a function which is cross-linkable by free radical process will be designated by the term "unsaturated oxirane"; an oxirane having a substituent containing no cross-linkable function will be designated by the term "saturated oxirane".

The polymerization initiator is selected from alkali metals, used in metallic form, in the form of an alcoholate or as a complex for example with a crown-ether. The alkali metal is preferably selected among cesium and potassium. Potassium alcoholates are particularly preferred.

When the initiator is an alkali metal or an alcoholate of alkali metal, the aprotic solvent in which the polymerization is carried out is selected among polar solvents. By way of example of polar solvent, there may be mentioned THF, dimethoxyethane and dimethylsulfoxide. However, in view of the fact that ethylene oxide and the monomers of the oxirane type are polar, a non polar solvent may also be used, for example toluene, containing a small quantity, for example 1%, of a polar solvent, for example THF.

When the initiator is used with a complexing agent such as for example a crown-ether, the aprotic solvent may be a polar solvent or a non polar solvent such as toluene.

The process of the present invention is carried out with at least one unsaturated oxirane. Among appropriate unsaturated oxiranes, oxiranes having the formula

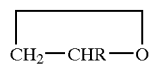

in which R is as defined above, may be mentioned. Allyl glycidyl ether and epoxyhexene are particularly preferred unsaturated oxiranes.

The function of the units derived from unsaturated oxiranes is to enable, either a cross-linking of the copolymer after the latter has been obtained, or reactions of grafting on the substituent, for example in order to fix ionic groups on the macromolecular chain.

The small amount of impurities in the monomers and in the solvent used for the polymerization may be obtained by treating the monomers and the solvent on a molecular sieve, or by distillation in the case of ethylene oxide.

The preliminary treatment of the reactor in order to remove impurities therefrom may be carried out for example by washing the reactor with a solution containing an initiator, and by removing the solution of initiator before the introduction of the reagents.

When carrying out the process of the invention, the reaction mixture contains very little impurities which would cause chain terminations. The yield of the reaction is therefore very high, and may reach values near 100%. The copolymer obtained thus contains a quantity of residual monomer which is sufficiently low to make its removal unnecessary, which is an important advantage when monomers having a high boiling point (for example higher than 150° C.) are used.

The process of the invention may also be used for copolymerizing ethylene oxide with at least one unsaturated oxirane and at least one saturated oxirane. The introduction of a saturated oxirane in the copolymer enables to reduce, and even to remove the crystallinity of the copolymer, and to modify its mechanical properties. Among the saturated oxiranes, those corresponding to the formula

in which R' is as defined above, may be mentioned.

When a copolymer of the present invention is intended to be used for preparing an ionically conductive material, it may be useful to deactivate the terminal reactive functions of the macromolecular chains, although the latter may not be numerous because of the high molecular masses.

The terminal functions are in general alcoholate or OH functions which are very reactive towards the lithium electrode and which contribute to the degradation of the polymer electrolyte/lithium electrode interface. The process of the invention may thus advantageously include an additional step in which the terminal functions are deactivated.

This deactivation may be carried out by means of 2-bromo-1-cyano-ethane, according to the following reaction scheme:

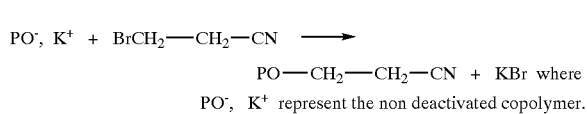

Deactivation of the terminal functions may also be carried out by means of methyl iodide or methyl sulfate. The copolymers have in this case methoxy terminal groups and there is respectively formed iodide or sulfate of K, if the terminal function to be disactivated is a potassium alcoholate.

The properties of the copolymers of the present invention make them particularly useful for preparing materials with ionic conduction. The high molecular mass has a favorable effect on the mechanical properties on the one hand and on the electrochemical properties on the other hand, as previously indicated. In addition, the statistical distribution of the unsaturated functions enables to obtain a homogeneous cross-linking when these functions are used for cross-linking. If these functions are used for grafting ionic groups on the copolymer, the statistical distribution of the grafted ionic groups enables to prevent the formation of privileged passageways for the ions.

In order to prepare an ionically conductive material, copolymers which contain at least 70 mole % of ethylene oxide units, about 2 to about 30 mole % of units derived from at least 1 saturated oxirane and about 0.05 to about 10 mole % of units derived from at least one unsaturated oxirane may be used. When the material is used without solvent or with little solvent (less than 10 weight %), the content in units derived from an unsaturated oxirane is preferably between 0.05 and 1 mole %. When the material is used as being swollen by a solvent, the content of units derived from an unsaturated oxirane may reach up to 10% molar. When the units derived from an unsaturated oxirane are intended to be used for grafting an ionic group on the copolymer, their content is preferably between 3 and 5 molar %.

According to an embodiment, an ionically conductive material according to the present invention essentially comprises one ionic compound which is easily dissociable while in solution in a copolymer according to the present invention. The ionic compound which is introduced into the copolymer before cross-linking or in the cross-linked polymer is selected among ionic compounds which are normally used for materials of the initially conductive solid polymer. By way of example, there may be mentioned ionic compounds $(1/aA)^+Y^-$, in which $A^{a+}$ represents a proton, a metallic cation, an organic cation of the ammonium, amidinium or guanidinium type, a being the valency of the cation $A^{a+}$; $Y^-$ represents an anion with delocalized electronic charge, for example $Br^-$, $ClO_4^-$, $AsF_6^-$, $R_fSO_3^-$, $(R_fSO_2)_2N^-$, $(R_fSO_2)_3C^-$, $C_6H_{(6-x)}(CO(CF_3SO_2)_2C^-)_x$ or $C_6H_{(6-x)}(SO_2(CF_3SO_2)_2C^-)_x$, $R_f$ represents a perfluoroalkyl or perfluoroaryl group, in which $1 \leq x \leq 4$. The preferred ionic compounds are lithium salts, more particularly $(CF_3SO_2)_2N^-Li^+$, $CF_3SO_3^-Li^+$, the compounds $C_6H_{(6x)}$—

[CO(CF$_3$SO$_2$)$_2$C$^-$Li$^+$]$_x$, in which x is between 1 and 4, preferably x=1 or 2, the compounds C$_6$H$_{(6x)}$—[SO$_2$(CF$_3$SO$_2$)$_2$C$^-$Li$^+$]$_x$, in which x is between 1 and 4, preferably x=1 or 2. Mixtures of these salts with one another or with other salts may be used. By way of example of mixtures of salts, there may be mentioned: (CF$_3$SO$_2$)$_2$N$^-$Li$^+$ and CF$_3$SO$_3$$^-$Li$^+$ or (CF$_3$SO$_2$)$_2$N$^-$Li$^+$ and C$_6$H$_4$—[CO(CF$_3$SO$_2$)$_2$C$^-$Li$^+$]$_2$ in various proportions, but preferably comprising 20 to 40 weight % of (CF$_3$SO$_2$)$_2$N$^-$Li$^+$. The ionic compound may be incorporated into the copolymer by immersing the copolymer, possibly in the form of a film, into a solution of the selected ionic compound in a solvent, the solvent being thereafter evaporated. According to a variant, the ionic compound may be incorporated into the copolymer by preparing a film from a solution comprising both the copolymer and the ionic compound.

According to another embodiment, an ionically conductive material according to the present invention essentially consists of a copolymer according to the present invention in which an ionic compound containing an unsaturation has been grafted on the radicals R by co-cross-linking with the units —CH$_2$—CHR—O—. In this case, a copolymer according to the present invention comprising about 3 to about 5 molar % —CH$_2$—CHR—O— units is preferably used. Among suitable ionic compounds which may be grafted onto the radicals R, there may be used derivatives of perhalogenated sultones carrying an ionic group described in WO93/16988, for example compounds of the type CH$_2$=CH—CH$_2$—(CF$_2$)$_2$—SO$_3$M', CH$_2$=CH—CH$_2$—O—CF(C$_y$F$_{2y+1}$)—CF$_2$SO$_3$M' and CH$_2$=CH—CF(C$_y$F$_{2y+1}$)—CF$_2$SO$_3$M', in which 0≦y≦4, preferably 1≦y≦3, M' represents a proton, a metallic cation, more particularly a cation of a monovalent metal, an organic cation. Among the metallic cations, the cations of an alkali metal are particularly preferred. Among the organic cations, there may be mentioned ammonium cations, guanidinium cations and amidinium cations, said organic cations being possibly quarternized. There may also be mentioned salts of bis(trifluoromethylsulfonyl)-methylide such as [CH$_2$=C(CH$_3$)—CO—C(SO$_2$—CF$_3$)$_2$]$^-$Li$^+$, [CH$_2$=C(CH$_3$)—C(SO$_2$—CF$_3$)$_2$]$^-$Li$^+$, [CH$_2$=CH—CH$_2$—CO—C(SO$_2$—CF$_3$)$_2$]$^-$Li$^+$, [CH$_2$=CH—Φ—SO$_2$—C(SO$_2$—CF$_3$)$_2$]$^-$Li$^+$, [CH$_2$=CH—CH$_2$—SO$_2$—C(SO$_2$—CF$_3$)$_2$]$^-$Li$^+$, [CH$_2$=CH—SO$_2$—C(SO$_2$—CF$_3$)$_2$]$^-$Li$^+$, [CH$_2$=CH—Φ—CO—C(SO$_2$—CF$_3$)$_2$]$^-$Li$^+$.

According to yet another embodiment, an ionically conductive material may essentially consist of a copolymer according to the present invention containing —CH$_2$—CHR'—O— units in which radical R' includes ionic groups. The ionic groups may be selected among the groups bis(trifluoro-methylsulfonyl)methylide —C(SO$_2$CF$_3$)$_2$M" in which M" is a metallic cation, preferably an alkali, or perfluorosulfonyl groups of the type —CH$_2$—O—(CF$_2$)$_q$—CF(C$_r$F$_{2r+1}$)—SO$_3$M, where M represents a monovalent metal. The units —CH$_2$—CHR'—O— then fulfill two functions. On the one hand, they decrease the regularity of the solvating macromolecular chain, and consequently the crystallinity; on the other hand, they confer to the copolymer a cationic unipolar ionic conductor character.

The different means described above for introducing ionic species into a copolymer according to the invention for the preparation of a ionically conductive material may of course be combined if desired.

Various additives may be added to the material of the present invention, in order to modify the properties of the final material. Thus, there may be incorporated a plasticizing agent such as ethylene carbonate, propylene carbonate, γ-butyrolactone, dimethylformamide, N-methylpyrrolidone, tetraalkylsulfamides, methyl ethers of polyethylene glycols of molecular weight between 200 and 2000 and, generally, the derivatives of polar molecules of low volatility. The proportion of these additives may be up to 1 to 90% of the total mass.

The materials with ionic conduction of the invention, consisting of a copolymer and an ionic compound, or of a copolymer carrying ionic substituents, can be used as solid polymer electrolyte separating electrodes and/or as a component of a composite electrode, especially when the copolymer has a molecular mass at least equal to 20,000. It is consequently an object of the invention to provide an electrochemical cell in which the electrolyte comprises an ionically conductive material according to the present invention, and/or in which one at least of the electrodes is a composite electrode comprising such a material. In a particular embodiment, the electrolyte is a membrane which separates the electrodes, the membrane consisting of an ionically conductive material according to the present invention, which is plasticized by the addition of a suitable solvent, for example a mixture of ethylene carbonate/propylene carbonate (weight ratio of about 1/1).

The copolymers and materials with ionic conduction of the present invention are useful for an electrochemical generator with alkali metal whether it is rechargeable or not. Such a generator comprises a negative electrode and a positive electrode which are separated by a solid polymer electrolyte, the solid polymer electrolyte comprising a copolymer according to the present invention. In such a generator, the electrodes may also contain an ionically conductive material of the present invention acting as a conductive binder, when they are prepared in composite form. In this particular application, the copolymers of the present invention are particularly interesting because they contain a small number of species which are susceptible to interfere with the electrochemical reactions. Indeed, the average high molecular masses obtained decrease substantially the number of reactive ends, and the high polymerization yield limits the content of residual catalyst. In addition, the average high molecular weight that the copolymers may possess give to the copolymers and the ionically conductive materials in which the copolymers are present an intrinsic mechanical behavior which is sufficient in the absence of cross-linking. However, if cross-linking is necessary, the statistical distribution of the cross-linkable units enables to obtain a very homogeneous cross-linking.

The copolymers and the ionically conductive materials are also useful in other electrochemical systems such as in electrochrome systems, systems for modulating light, for the preparation of selective membranes or membranes of reference in membrane pickups.

The present invention is illustrated by the examples which follow, it being understood that the invention is not limited to the examples given.

In the following examples, the polymerization was carried out in stainless steel Parr® reactors having a capacity of 2 l, provided with a stirrer and a bottom valve enabling to empty the reactor through the bottom. All the operations of transfer have been carried out under inert atmosphere by using very dry argon or nitrogen and without oxygen.

In each example, the reactor was dried by washing it with a solution of initiator and by removing this initiator solution before introducing the reagents into the reactor.

Ethylene oxide was distilled, the solvents and the other monomers used were dried on a molecular sieve before introducing them into the reactor, in order to lower their water content to less than 100 ppm, which value is verified by the Karl-Fischer method.

BRIEF DESCRIPTION OF DRAWINGS

The invention is illustrated but not restricted by means of the following drawings in which.

EXAMPLES

Example 1

Figure 1:
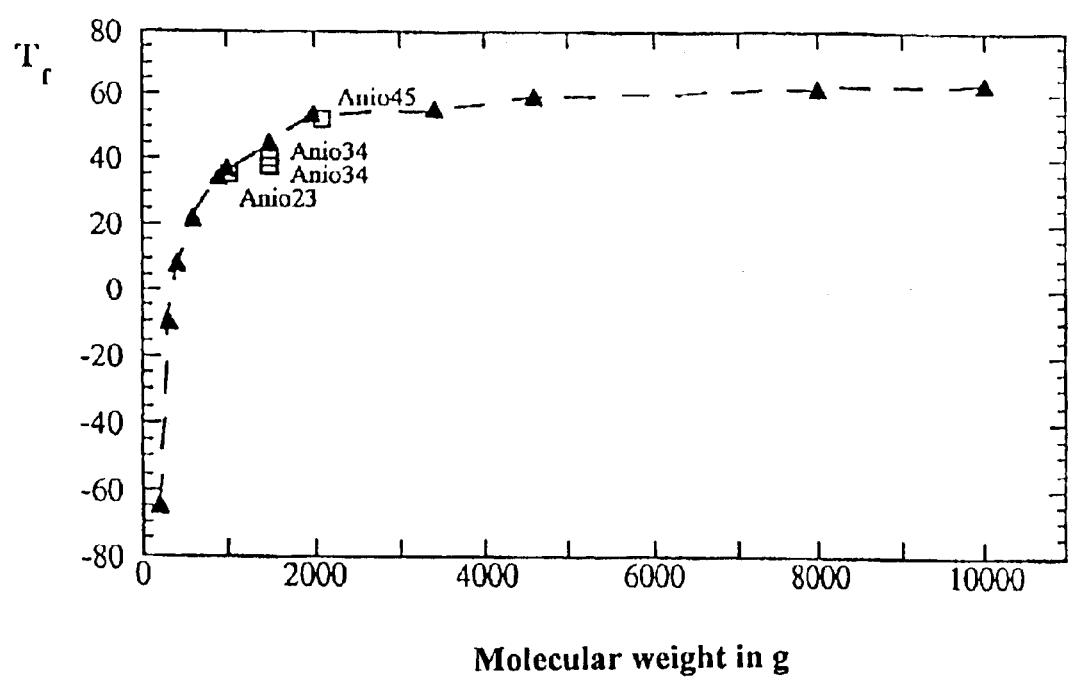
FIG. 1 is a curve of the variation of the melting temperature as a function of the average molecular weight for PEG, $Anio_{23}$, $Anio_{34}$ and $Anio_{45}$.

In a reactor which is free from traces of water and impurities containing 250 ml of toluene, $10^{-3}$ mole of potassium tert-butanolate and 3 ml of THF, a mixture of 83.9 g of ethylene oxide, 10 g of methyl glycidyl ether and 5.1 g of allyl glycidyl ether was introduced. The temperature of the reactor was raised to 120° C. and maintained at that level for 22.5 hours. A decrease of the pressure from $10.3 \times 10^5$ Pa to $10^5$ Pa was observed. The temperature was thereafter lowered to 70° C. and 100 mg of a sulfide of 3-tert-butyl-4-hydroxy-5-methyl-phenyl commercialized by Aldrich, was added, this product being used as stabilizing and antioxidizing agent for the polymer. The reactor was thereafter washed with a small quantity of toluene and 93 g of copolymer was recovered after evaporation of the solvent, which corresponds to a yield of 100%. The DSC analysis shows a melting peak Tf at 30° C. and a vitreous transition temperature Tg=−64° C. The average molecular mass in number, determined by steric exclusion chromatography (SEC), is about 105,000, with a polymolecularity index of 1.7.

Example 2

In a reactor free from traces of water and impurities and containing 115 ml of toluene, $2.10^{-3}$ mole of potassium tert-butanolate and 6 ml of THF, a mixture of 87.2 g of ethylene oxide, 9.8 g of methyl glycidyl ether and 5 g of allyl glycidyl ether was introduced at room temperature. The temperature of the reactor was raised to 120° C. and maintained at that temperature for 22 hours. A decrease of the pressure from $10.3 \times 10^{-5}$ to $1.4 \times 10^{-5}$ Pa was noted. 100 mg of a sulfide of 3-tert-butyl-4-hydroxy-5-methyl-phenyl in solution in 50 ml of toluene were thereafter added. The copolymer was recovered after evaporation of the solvent with a yield of 85%, the essential portion of the losses being due to the fact that a small quantity of copolymer remains stuck on the wall of the reactor. A DSC analysis shows a melting peak Tf at 30° C. and a vitreous transition temperature Tg=−61° C. The average molecular mass in number, determined by steric exclusion chromatography (SEC), is about 80,000, with a polymolecularity index of 1.9.

Example 3

In a reactor which is free from traces of water and impurities, 250 ml of toluene, $10^{-3}$ mole of potassium t-butanolate and 3 ml of THF were added. The temperature of the reactor was raised to 110° C. and, thereafter, a mixture of 90.2 g of ethylene oxide, 8.4 g of methyl glycidyl ether and 1.9 g of allyl glycidyl ether was added by means of a burette under pressure. The temperature of the reactor was raised to 120° C. and was kept at that level for 22 hours, during which a pressure decrease from $7.7 \times 10^{-5}$ to $2.6 \times 10^{-5}$ Pa was noted. The content of the reactor was thereafter poured into a glass flask containing 100 mg of 3-tert-butyl-4-hydroxy-5-methyl-phenyl sulfide under an atmosphere of argon. 94.4 g of copolymer were recovered after evaporation of the solvent, which corresponds to a yield of 94%, not taking into account the copolymer which was not extracted from the reactor. A DSC analysis shows a melt peak Tf at 33° C. and a vitreous transition Tg=−59° C. The average molecular mass in number, determined by steric exclusion chromatography (SEC), was about 110,000, with a polymolecularity index of 2.2.

Example 4

A material prepared according to example 3 was used to produce a lithium battery operating at 60° C. with a composite $TiS_2$ cathode. The polymer electrolyte was prepared by dissolving the copolymer, 2% by weight of benzoyl peroxyde and the salt lithium bis(trifluorosulfonyl)imide (TFSI) in acetonitrile in a ratio O/Li of 30/1. The solution was thereafter poured in the form of a film having a thickness of 25 μm and the film was dried under vacuum at 90° C. Similarly, the composite electrode was prepared on nickel by the solvent method utilizing Shawinigan black at a rate close to 5% by weight, some copolymer and $TiS_2$, so as to give a composite electrode whose capacity is 3 Cb per $cm^2$. The battery was mounted with a lithium anode 22 μm by consecutive pressing of the films under vacuum at 85° C., after which it was cycled at 60° C. It is noted that the utilization was maintained at more than 85% during more than 150 cycles carried at a discharge rate of 6 hours (C/6) and at a charge rate (C/12) without any loss of utilization. This test confirms the electrochemical stability of the copolymers of the present invention which have a high molecular mass.

Example 5

Into a reactor there are introduced 100 ml of THF, 0.1 g of potassium-butanolate, 80 g of ethylene oxide (OE) and 9 g of alkyl glycidyl ether (AGE), which corresponds to an OE/AGE ratio of 22. The temperature of the reactor was raised to 120° C. and was maintained at that level for 6 hours during which a pressure decrease from $7 \times 10^5$ Pa to $1.3 \times 10^5$ Pa was noted. At the end of the reaction, the reaction mixture was deactivated by introducing methanol into the reactor and some 3-tert-butyl-4-hydroxy-5-methyl-phenyl sulfide was added. 87 g of copolymer was recovered, hereinafter designated by $Anio_{22}$, corresponding to a nearly quantitative yield. The characteristics of the copolymer are the following: Mw =120,000 g; polymolecularity index 1 =Mw/Mn =1.9; Tg =−62° C.; Tf=35.60° C.; rate of crystallinity X=0.37.

The number of OE units between two AGE units in the copolymer $Anio_{22}$ was evaluated in the following manner, presuming that there is a regular distribution of the AGE units in the copolymer chain, namely 22 OE units between 2 AGE units. It was assumed that the melting temperature of a copolymer OE/AGE in which n units OE are found between 2 AGE units is substantially identical to the melting temperature of a polyethyleneglycol (PEG) whose average molecular weight Mw is substantially identical to that of a sequence $-(OE)_n-$, i.e. Mw =n×44. A determination was then made of the melting temperature of a plurality of PEG having different molecular weights and a curve Tf is produced as a function of Mw. FIG. 1 represents the variation of the melting temperature Tf, expressed in ° C, as a function of the average molecular weight, expressed in grams, for a PEG (black triangles). It was noted that the melting temperature of the PEG increases very rapidly with the lengths of the chain to reach 65° C. for weights close to 8,000 g. In addition, according to this curve, the PEG whose melting temperature is close to 35° C. has an average molar mass of about 1,000 g, which corresponds to about 22 OE units.

Three similar evaluations were carried out from copolymers obtained by utilizing such quantities of monomers that the molar ratios OE/AGE are respectively 23, 34 and 45 (copolymers respectively designated $Anio_{23}$, $Anio_{34}$, and $Anio_{45}$). A melting temperature of each copolymer was determined and inserted on the curve of FIG. 1 (white squares). It was confirmed that the melting temperature of a copolymer $Anio_n$ is substantially identical to that of PEG having a molecular weight substantially equal to n×44. These tests thus confirm the regular distribution of the monomeric units in the copolymers OE/AGE obtained by the polymerization process according to the present invention.

Example 6

The copolymer $Anio_{22}$ of example 4 was cross-linked at 70° C. in the presence of 2 weight % of benzoyl peroxide with respect to the copolymer. The cross-linked network obtained has a melting temperature Tf=28° C., and a rate of crystallinity X=0.20.

Many electrolytes were prepared in the form of a film starting from the copolymer $Anio_{22}$. Solutions in acetonitrile of copolymer $Anio_{22}$, trifluorosulfonyl imide of lithium (TFSI) and benzoyl peroxide in which the TFSI content varies from one solution to the other, were prepared, and each solution was poured onto a support. After evaporation of the solvent, each film of copolymer obtained was cross-linked by heating, kept under vacuum during several days, and preserved in a glove box. The conductivity was determined at different temperatures between 20° C. and 84° C.

Figure 2:
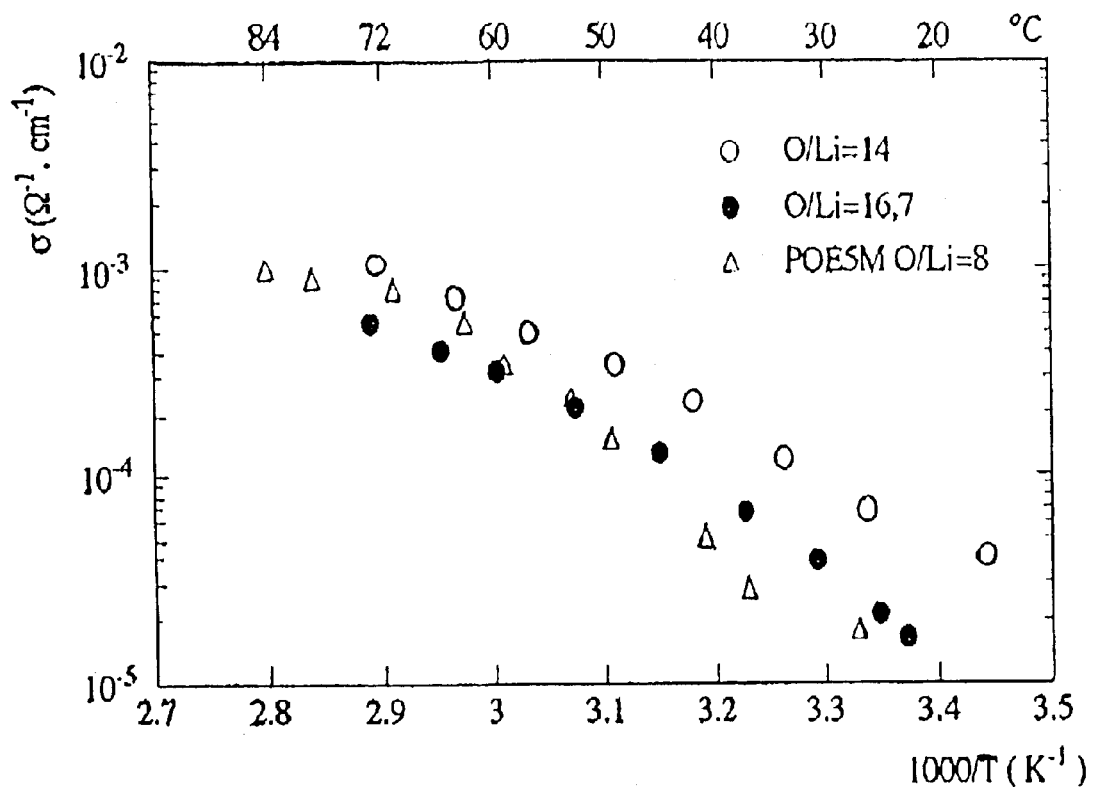
FIG. 2 represents the variation of the conductivity $\sigma$ as a function of the temperature for different electrolytes.

FIG. 2 represents the variation of the conductivity σ, expressed in $\Omega^{-1}cm^{-1}$, as a function of the temperature, expressed in ° C., for different electrolytes. The clear circles correspond to an electrolyte consisting of the copolymer $Anio_{22}$ and the salt TFSI in which the ratio O/Li=14; the black circles correspond to an electrolyte consisting of the copolymer $Anio_{22}$ and the TFSI salt in which the ratio O/Li=16.7; the clear triangles correspond to an electrolyte consisting of a poly(oxyethylene) whose molecular weight is $5 \times 10^6$ g/mole and in which the TFSI salt content is such that O/Li=8, usually considered as reference polymer having the best ionic conductivity.

The conductivities obtained for the electrolytes of the invention are, within the entire temperature range explored, higher than those noted for the reference complex poly(oxyethylene).

A DSC analysis has confirmed the completely amorphous character of the electrolytes.

The table which follows gives vitreous transition temperature Tg (° C.) for different salt concentrations, indicated by the atomic ratio O/Li, and establishes that the vitreous transition temperature of an electrolyte prepared from a copolymer according to the invention slowly increases with the salt concentration.

| O/Li | Tg (° C.) |
|------|-----------|
| 8    | −33.6     |
| 9    | −34.6     |
| 13   | −38.6     |
| 16.7 | −46       |
| 22   | −49.2     |
| 27.5 | −51.2     |

The range of electrochemical stability of the electrolytes network $Anio_{22}$/LiTFSI was established by cyclic voltametry on a platinum micro-electrode at 81° C. The volt-amperograms obtained show the lithium deposit, in the form of a sharp peak at about OV vs lithium. A return sweep shows the reoxidation of the alloys and the intermetallic compounds, formed between platinum and lithium. No peak resulting from the oxidation or the reduction of the copolymer was noted in the power range explored, namely from 0 to +3.9 V vs Li/Li+.

A thermogravimetric analysis shows that the electrolytes are stable up to 240° C., which is largely sufficient when they are used in all solid lithium batteries, since melting of lithium takes place already at 180° C.

Example 7

150 ml of THF, 0.12 g of potassium t-butanolate, 89 g of ethylene oxide (OE), 9.8 g of epoxyhexene and 8.4 g of an epoxyde

in which R' represents a group $CH_2$—O—$CF_2$—$CF_2$—$SO_3$—K have been added to a reactor. The temperature of the reactor was raised to 110° C. and maintained at that level for 12 hours. Then, the reaction mixture was deactivated by introducing methanol into the reactor and a precipitate was formed in hexane, which has enabled to give 103 g of a polymer having ionophoric functions. The yield is near 96%.

An analysis by steric exclusion chromatography (CES), on two columns of CES 10 nm, of a solution obtained by dissolving the precipitate in THF has not permitted to detect residues of the ionic monomer

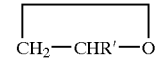

which would not have reacted.

A cross-linked membrane was produced by adding 1% by weight (with respect to the polymer) of benzoyl peroxyde to a solution of the copolymer in a solvent and by heating at 80° C. during two hours. The conductivity of the membrane obtained is $10^{-5}$ S.cm$^{-1}$ at 37° C. and $10^{-4}$ S.cm$^{-1}$ at 77° C.

An analysis by DSC shows a melting point at 24° C. and a vitreous transition temperature of −55° C.

A sample of the cross-linked membrane was swelled three times with a solution of $(CF_3SO_2)_2NLi$ in acetonitrile, in order to exchange the cations K$^+$ with cations Li$^+$. The membrane was thereafter placed on a filtrating crucible and the solution of acetonitrile was removed by filtration. Then, the membrane was washed three times in 50 ml of acetonitrile in order to remove any trace of free salt and this was followed by careful drying. Its conductivity was then $10^{-5}$ S.cm$^{-1}$ at 45° C. and 10$^{-4}$ S.cm$^{-1}$ at 95° C. Its melting temperature was 25° C. and its vitreous transition temperature was −57° C.

Example 8

An ionically conductive unipolar electrolyte was prepared by co-cross-linking the copolymer Anio$_{22}$ prepared according to example 4 with an ionophoric compound carrying a double allylic bond, CH$_2$=CH—CH$_2$—O—CF$_2$—CF$_2$—SO$_3$Li. Cross-linking was carried out in the presence of 2% by weight of benzoyl peroxyde at 70° C. during 3 hours. The quantity of ionophoric compound added corresponds to a ratio O/Li of 15. An analysis of the solvents after washing the cross-linked membrane shows that about 90% of the salt was incorporated into the network. In the network, the ratio O/Li is therefore 17.

A DSC analysis shows a melting peak at 19° C. and a vitreous transition temperature of −58° C.

The electrolyte reaches a conductivity of 10$^{-5}$ S.cm$^{-1}$ at 33° C. and 10$^{-4}$ S.cm$^{-1}$ at 70° C.

The membrane was thereafter swelled by incorporating 30% by weight of a mixture in a 2/1 molar proportion of propylene carbonate and ethylene carbonate. The conductivity has then reached 5.10$^{-5}$ S.cm$^{-1}$ at 20° C. and 10$^{-3}$ S.cm$^{-1}$ at 60° C.

We claim:

1. Ionically conductive material comprising a statistical copolymer which comprises ethylene oxide units, —O—CH$_2$—CHR—units wherein R is a substituent containing a reactive function which is cross-linkable by free radical process, R may vary from one unit to the other, and —O—CH$_2$—CHR'—units, wherein R' is a substituent containing no function which is cross-linkable by free radical process, R' may vary from one unit to the other; and which has a polymolecularity index I=Mw/Mn lower than or equal to 2.2, a random distribution of the different monomer units and an average molecular mass in Mn number at least equal to 20,000.

2. Ionically conductive material according to claim 1, wherein ionically conductive material further comprises dissociable salt.

3. Ionically conductive material according to claim 1, wherein the copolymer has been converted by grafting ionic groups on the reactive function of the substituent R of the —O—CH$_2$—CHR— units.

4. Ionically conductive material according to claim 1, wherein the copolymer comprises —O—CH$_2$—CHR'— units in which the radical R' comprises an ionic group.

5. Ionically conductive material according to claim 1, wherein the ionically conductive material is swelled by means of a solvent.

6. Ionically conductive material according to claim 1, wherein the average molecular mass in Mn number is at least equal to 100,000.

7. Ionically conductive material according to claim 1, wherein the —O—CH$_2$—CHR— is selected from the group consisting of allyl glycidyl ethers, epoxyhexene and mixtures thereof.

8. Ionically conductive material according to claim 1, wherein R represents a radical comprising an unsaturated carbon-carbon bond.

9. Ionically conductive material according to claim 1, wherein the substituent R is a radical having the formula CH$_2$—CH—(CH$_2$)$_q$—(O—CH$_2$)$_p$ wherein $1 \leq q \leq 6$ and p=0 or 1, or formula CH$_3$—(CH$_2$)$_y$CH=CH—(CH$_2$)$_x$—(OCH$_2$)$_p$, in which $0 \leq x+y \leq 5$ and p0 or 1.

10. Ionically conductive material according to claim 1, wherein the substituent R' is selected among alkyl radicals, among alkoxy radicals such as —(CH$_2$)$_n$—O—((CH$_2$)$_m$—O)$_p$—CH$_3$ radicals, in which $0 \leq n \leq 4$ and $0 \leq p \leq 20$; among alkyl(perfluoroalkyl sulfonate) ether radicals; among radical incorporating an ionophoric function in which the negative charge is carried by the bis(trifluoromethylsulfonyl) methylide carbanion—C(SO$_2$CF$_3$)$_2$ M", wherein M" represents a metallic cation.

11. Ionically conductive material according to claim 1, wherein the ionically conductive material contains at least 70 mole % of ethylene oxide units, about 2 to about 30 mole % of —O—CH$_2$—CHR'— units and about 0.05 to about 10 mole % of —O—CH$_2$—CHR— units.

12. Ionically conductive material according to claim 1, comprising deactivated terminal functions.

13. Ionically conductive material according to claim 10 wherein the substituent R' is selected among alkyl radicals having 1 to 16 carbon atoms and wherein M" represents a monovalent cation or cation of an alkali metal.

* * * * *